United States Patent [19]

Coons et al.

[11] 4,011,930

[45] Mar. 15, 1977

[54] MEANS TO PRESENT LUBRICATING AND COOLING FLUID TO FRICTION MATERIAL IN A WET BRAKE SYSTEM

[75] Inventors: Robert R. Coons, Indian Head Park; Richard G. Hennessey, Oak Lawn, both of Ill.

[73] Assignee: International Harvester Company, Chicago, Ill.

[22] Filed: Apr. 12, 1976

[21] Appl. No.: 676,098

[52] U.S. Cl. .................... 192/113 B; 188/264 E
[51] Int. Cl.² ............... F16D 13/72; F16D 65/853
[58] Field of Search .... 188/218 XL, 264 B, 264 D, 188/264 E; 192/107 C, 113 B

[56] References Cited

UNITED STATES PATENTS

| | | | |
|---|---|---|---|
| 1,808,511 | 6/1931 | Robbins | 188/264 D UX |
| 3,094,194 | 6/1963 | Kershner | 188/264 E X |
| 3,249,189 | 5/1966 | Schjolin et al. | 192/113 B X |
| 3,422,943 | 1/1969 | Zeidler | 188/264 E X |
| 3,610,384 | 10/1971 | Borck | 192/113 B |

*Primary Examiner*—Duane A. Reger
*Attorney, Agent, or Firm*—Douglas W. Rudy; Floyd B. Harman

[57] ABSTRACT

Providing a fluid distribution device for use in a clutch or brake system having a reaction member which operates in a fluid bath whereupon the fluid distribution device after being submerged in the fluid bath tends to distribute fluid peripherally to the reaction member such that fluid is distributed evenly and uniformly to the frictional material integral with the periphery of the reaction member.

15 Claims, 6 Drawing Figures

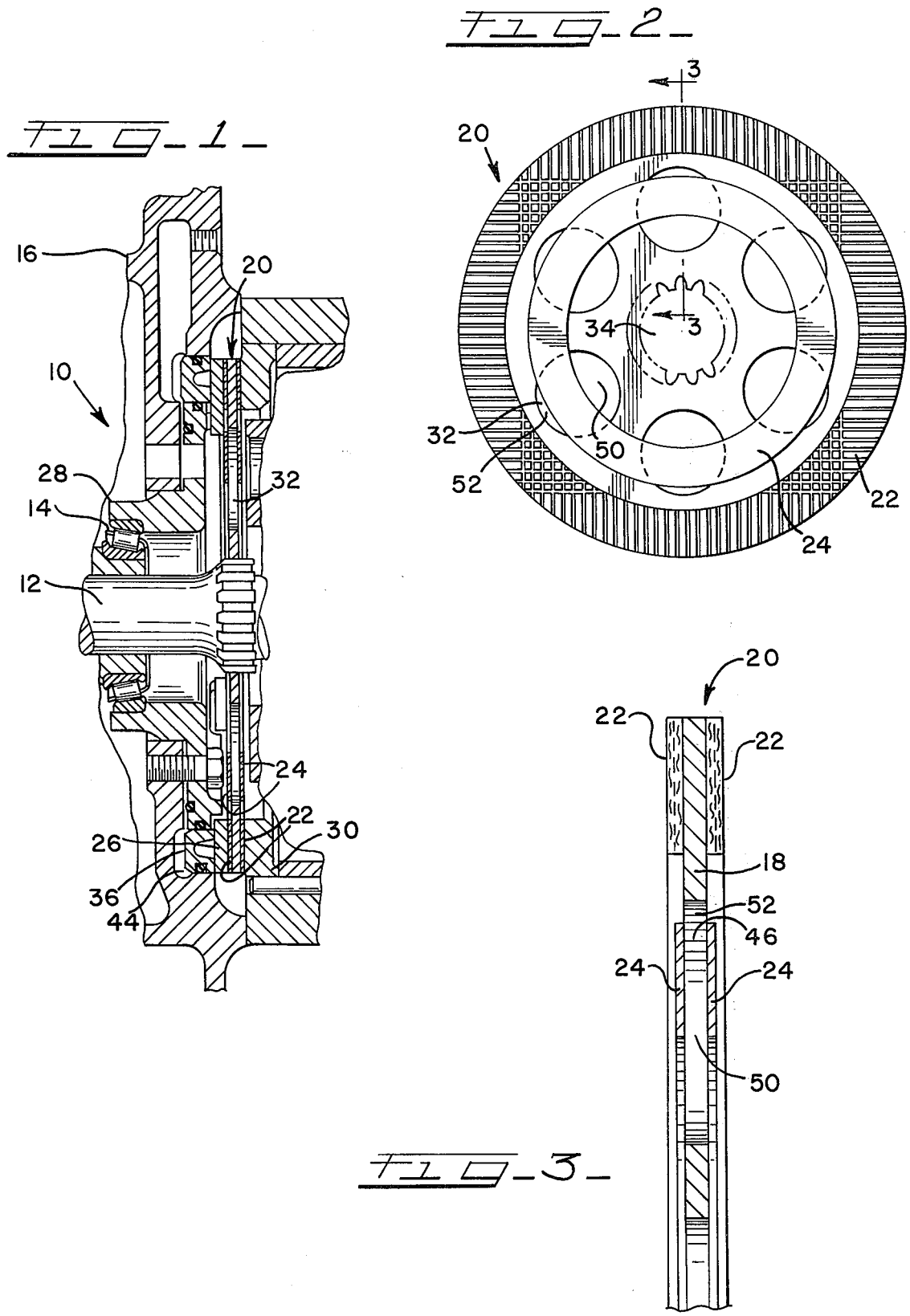

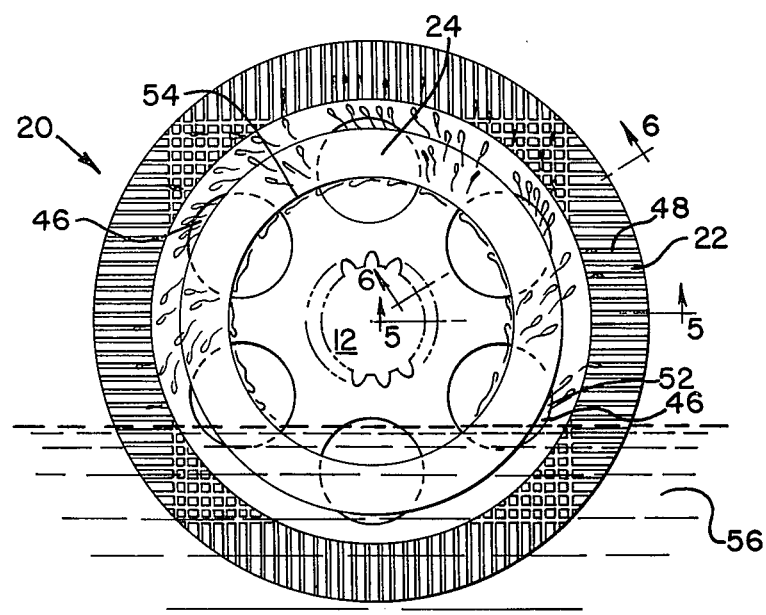
FIG-4-
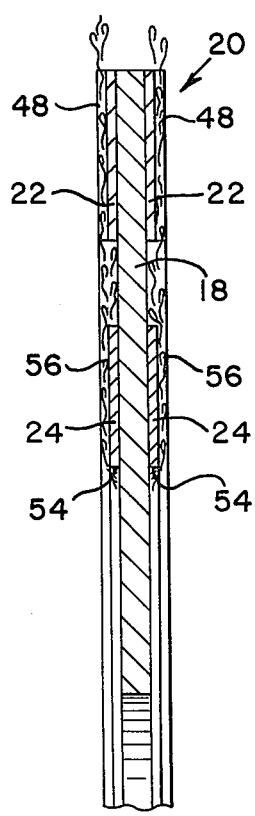
FIG-5-
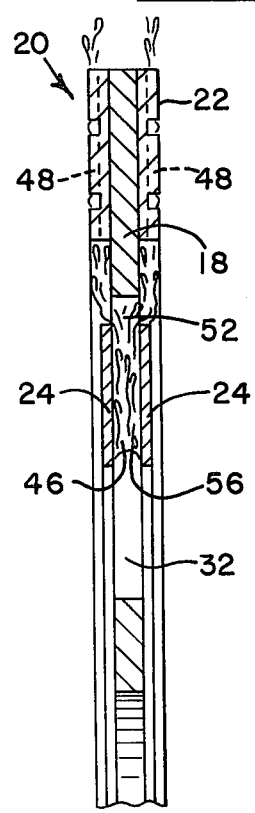
FIG-6-

MEANS TO PRESENT LUBRICATING AND COOLING FLUID TO FRICTION MATERIAL IN A WET BRAKE SYSTEM

BACKGROUND OF THE INVENTION

1. Field of the Invention

The present invention relates to disc brakes and clutches operating in a fluid bath for vehicles generally and more particularly to reaction members for such systems that provide increased distribution efficiency of fluid to the reaction members.

2. DESCRIPTION OF THE PRIOR ART

Wheel brakes carried on axles residing in a fluid bath are in contemporary use on vehicles such as farm machinery as well as others. Typically agricultural and industrial tractors are equipped with inboard brakes for the rear axle. These inboard brakes may be disc brakes which operate in an oil bath which also serves as a source of fluid for hydraulic components of a tractor as well as a lubricant for the differential. These brake systems utilize an annular piston to apply presure to a disc which is splined to an axle or a planetary drive shaft. The opposite side of the disc adjoins a stationary outer disc ring and is in contact with it during braking. The brake operates in a fluid environment that aids in the cooling of a brake disc. The frictional surface on either side of the disc may have a lining of microscopically porous paper-like material bonded to either side thereof. The disc will generally have a splined central aperture compatible with the splines on the vehicle drive axle or planetary drive shaft. In addition to the central aperture it is usual to find a plurality of radially disposed apertures either circular elliptical, square, rectangular, etc. in the disc between the splined central aperture and the frictional surface or lining on the disc. These apertures allow fluid to pass from one side of the disc to the other side of the disc thus allowing the benefit of cooling fluid to reach the frictional surface on either side of the disc.

Through normal braking the heat buildup in the lining or frictional material is significant. The fluid bath in which the brake or clutch disc operates will generally work with the disc to provide a media to dissipate heat from the frictional material. However, there are extreme instances where the brake disc or clutch disc will be rotating through the fluid bath at such a rate that it is difficult to maximize the transfer of heat between the frictional material of the disc and the fluid bath. In these instances it has been found that increased lubrication and cooling effectivenss can be attained if fluid from the fluid bath can be pumped to and over the frictional surface of the disc.

The more conventional brake system provides cooling and lubricating oil to the friction material by either dipping the friction material into the oil and/or the more costly means of causing the oil to flow across the friction material surface by a forced or pressurized lubrication system.

The means provided by this invention strives to lubricate the frictional material as well as provide an increased amount of fluid to the frictional material such that heat buildup therein can be carried away.

SUMMARY OF THE INVENTION

This invention is concerned with friction discs of the type used as brake friction plates or clutch friction plates. The friction disc contemplated herein is for use in a fluid environment and the invention relates to an improved method of insuring that the fluid is directed to the lining surface of the friction disc.

A core plate having a central splined aperture for positive but axially slideable engagement with a splined axle is provided. The core plate is further provided with a plurality of apertures therethrough that permit fluid passage from one side of the core plate to the other side. A frictional material is bonded or otherwise affixed to the outer periphery of the core plate on each side thereof. The frictional material is of porous paper-like material having an open cellular structure capable of absorbing and passing fluid. A pattern of grooves are machined or formed in the frictional material such that fluid can flow from the inboard edge area of the frictional material to the outboard edge of the frictional material.

A flow improving fluid baffle ring is bonded or otherwise affixed to each side of the core plate. The fluid baffle ring is a continuous ring of material relatively thin in cross section that is positioned over a portion of the apertures in the core plate. A portion of the top and the bottom of each aperture is not covered by the fluid baffle ring. The fluid baffle ring functions to improve the distribution of fluid to the frictional material in two manners.

First the fluid baffle rings on each side of the core plate form an open ended chamber within the apertures of the core plate. This chamber may receive fluid when the core plate is rotated into a fluid bath and may disperse fluid when the aperture is rotated out of the fluid bath.

Secondly, the fluid is accumulated between the inboard edge of the fluid baffle ring and the face of the core plate when the friction disc is rotated into the fluid bath. When the disc is rotated out of the bath the fluid that has been accumulated is urged past the edge of the fluid baffle ring by the rotational forces propagated in the rotating disc. These two fluid accumulating and dispersing systems both provide fluid to the frictional material at a flow and volume rate greater than that experienced when the fluid baffle ring is not provided.

Of the more significant advantages of the proposed system is that it provides for better heat dissipation from the frictional surface of the frictional disc. With this improved heat dissipation advantage is directly related the improved frictional efficiency in braking or clutching applications as well as increased life of the frictional material due to the elimination of oxidation and distruction of the paper.

A closely related advantage of this invention concerns the increased lubrication of the frictional material. By providing an increased quantity of fluid to the material the open cellular structure is maintained thus preventing a change in the frictional characteristics of the frictional material.

BRIEF DESCRIPTION OF THE DRAWINGS

FIG. 1 is a cross-sectional view in elevation, with portions broken away or omitted, of a disc brake system incorporating a preferred embodiment of the present invention;

FIG. 2 is a side elevation view of the friction disc shown in FIG. 1;

FIG. 3 is a cross-sectional view of the friction disc as taken through plane 3—3 of FIG. 2;

FIG. 4 presents an elevation view of a friction disc as it would pass through a fluid bath;

FIG. 5 is a section view through 5—5 of FIG. 4 showing fluid buildup on the friction disc surface; and FIG. 6 is a section view through 6—6 of FIG. 4 showing fluid buildup in the apertures of the friction disc.

DESCRIPTION OF THE PREFERRED EMBODIMENT

Referring now to FIGS. 1 and 2 a disc brake mechanism, indicated generally at 10 is utilized to constrain or stop a planetary drive shaft 12 rotatably mounted by a bearing 14 within a housing 16 and a bearing support 28. The housing 16 may consist of several parts which are secured together and function as a unitary structure.

The brake mechanism 10 includes a brake disc 20 having a lining bonded to the opposite faces thereof. The disc 20 is splined or otherwise secured to while being axially slideable on the shaft 12 and consequently rotates therewith.

The brake disc 20 is a circular flat plate having a splined centrally located aperture 34 which allows mounting of the brake disc to the splines of the drive shaft 12. The brake disc has an inner surface and an outer surface each surface having a lining material 22 affixed thereto. The lining material 22 may be composed of a frictional material having a microscopically porous paper-like construction. Also bonded or otherwise affixed to the inner and outer surfaces of the friction disc is a fluid baffle ring 24 which is the focus of this invention. The brake disc 20 has a diameter approximating the diameter of the brake ring 26 which also approximates the outer diameter of the reaction ring or outer disc ring 30.

A plurality of radially disposed apertures 32 are provided in a brake disc 20 in the area between the splined central aperture 34 of the brake disc and the outer diameter area of the brake disc which host the frictional material. These apertures allow fluid flow past or through the brake disc while at the same time reducing the weight of the brake disc.

The inboard reaction ring or brake ring 26 is retained within and is movable with respect to the housing 16 axially of the shaft 12. The brake ring 26 has a flat surface formed on one side for engagement with a lining or frictional material 22 on the inner surface of the brake disc while the opposite face is also a flat surface for even contact with the annular piston 36. The brake ring 26 is equipped with three internal lugs (not shown) which align with three channels in the housing 16. The internal lugs in the channels permit axial movement of the brake ring 26 parallel to the planetary drive shaft 12 upon displacement of the annular piston 36 while prohibiting rotational movement of the brake ring 26 around the shaft 12.

The annular piston 36 is suitably sealed for movement within the annular chamber 44 formed between the housing 16 and bearing support 28. Conventional means are provided for admitting fluid under pressure to a chamber 44 to apply or engage the brake mechanism 10 or for venting or draining the fluid.

While the description above is concerned primarily with the use of the invention in a wet brake system it is also noted that the invention will be equally applicable in a wet clutch device. The brake disc 20 would be equivalent to a clutch disc and would be similar in structure. The brake disc 20 and the embodiment as a clutch disc can be thought of as simply frictional discs.

A clear picture of the invention is presented in FIGS. 2 and 3. FIG. 2 is the elevation view of the friction disc 20 shown mounted on the splined shaft 12 of FIG. 1. FIG. 3 is a sectional view of the friction plate 20 through the plane indicated by 3—3 of FIG. 2. In addition to the lining material 22 affixed to the core plate 18 a fluid baffle ring 24 is also affixed to each side of the core plate.

The fluid baffle ring 24 is a relatively thin piece of stock such as but not limited to metallic stock generally referred to as shim stock that could be bonded to the core plate 18. The width of the ring 24 would be such that the ring could be placed concentrically of the center of the friction plate disc 20 without completely covering the radially disposed apertures 32. It would be most desirable to have the fluid baffle ring 24 placed over the apertures 32 such that a small portion of each aperture 32 is left uncovered in the outboard portion of each aperture close to the frictional material 22. A larger area of the radially disposed apertures 32 will be exposed at the inner portion of the apertures 32 closer to the splined centrally located aperture 34. A typical relationship between the fluid baffle ring 24 and radially disposed apertures 32 showing the relative areas of exposed aperture is shown in FIG. 2. Although this represents the concept of the invention, it is not to be construed as a limit to the baffle ring width or the covered or uncovered relative areas of the apertures 32.

The installation of the fluid baffle ring 24 to each side of the core plate 18 performs several functions. Two of these functions concern and have to deal with increasing the amount of fluid traversing the frictional material 22 of the friction disc 20.

In a first operating function the rings 24 on each side of the core plate 18 form an open ended chamber 46 within the apertures of the core plate 18. The innermost opening 50, that is the opening closest to the splined central aperture 34 of the core plate 18 is larger than the outer opening 52 outward from the periphery of the extreme outer edge of the fluid baffle ring 24. As the friction disc 20 is rotated through a fluid bath such as the oil bath 56 depicted in FIG. 4, the fluid will enter the open ended chamber 46 as the friction disc 20 continues to rotate on the planetary drive shaft 12 in the direction indicated by the arrow. When one of the open ended chambers 46 progresses out of the fluid bath a portion of the quantity of fluid will be allowed to pass out of the open ended chamber 46 from the outer opening 52 thereof. This fluid will then follow the surface of the core plate 18 and be restrained along the innermost periphery of the frictional material 22 until it is drained through one or more of the grooves 48 in the frictional material 22. Fluid will continue to be drained or exhausted from the open ended chamber 46 as the friction disc 20 is rotated.

A second method of distributing fluid to the frictional material is accomplished by the innermost edge of the fluid baffle ring 24. This edge 54 will trap fluid between it and the face of the core plate 18 when the friction disc 20 passes into the fluid bath. As before, with the open ended chamber 46, the quantity of fluid has been trapped on this edge 54 will be dissipated to the inner edge of the frictional material 22 as the friction disc 20 is rotated by the drive shaft 12. The force generated by the rotational speed of the friction disc 20 will cause the trapped fluid (at 54) to be released from this location and pass outward from the innermost area of the friction disc to outboard areas.

FIGS. 4, 5 and 6 clearly show the path of fluid that has been picked up and trapped by the fluid baffle ring 24 as it passed through the fluid bath 56. FIG. 6, which is a cross-sectional view through an apertured portion of the friction disc 20, shows fluid 56 trapped in the open ended chamber 46 which is formed by a fluid baffle ring 24 bridging an axially disposed aperture 32. The fluid 56 is escaping radially (upward in this view) from the outer opening 52 of the aperture 32 and progressing down the faces on either side of the core plate 18 to the innermost edge of the friction material 22. The fluid 56 will then pass through the grooves 48 in the friction material and then finally away from the friction disc 20.

A similar occurrence is shown in FIG. 5 which is a cross-sectional view of the friction disc 20 through plane 5—5 of FIG. 4. In this view the fluid 56 is detained at the inner edge 54 of the fluid baffle ring 24. As the friction disc 20 rotates the fluid 56 escapes (upwardly in this view) radially from engagement with the inner edge or ledge 54 and then passes across the faces of the core plate 18 to the innermost edge of the friction material 22. The fluid 56 will then pass through the grooves 46 in the friction material and then away from the friction disc 20.

Thus it has been shown that the open ended chamber 46 and the edge of the fluid baffle plate 54 (of 24) both contribute to supply an increased amount of fluid to the frictional material 22.

In the preferred embodiment the fluid will be lubricating hydraulic oil that would serve the purposes of lubricating the planetary drive on a vehicle wheel, cool the same and further act as a fluid for operation of fluid motors such as hydraulic cylinders, motors and the like.

Furthermore, although FIG. 1 presents a disc brake mechanism, it is highly possible that the lubrication and cooling effect of the oil or fluid would be equally advantageous in the realm of wet clutches as previously mentioned.

Another significant item of note is that it would also be possible to construct a friction plate using only one or the other of the fluid pickup means which have been jointly associated with this invention. For instance, if a core plate similar to the core plate 18 were constructed without the radially disposed apertures 32 there would still be justification in bonding the fluid baffle ring 24 to each opposite face of the core plate. The baffle ring 24 would still increase the amount of fluid being delivered to the friction material 22 due to the fluid detention at the innermost edge of the fluid baffle ring 54 thus improving the lubrication of the friction material as well as increasing the quantity of heat transferred from the friction material to the fluid bath.

Conversely, a segemented fluid baffle ring (not shown) is anticipated by this invention. In this instance the fluid baffle ring would bridge the radially disposed apertures 32 as shown to make the open ended chambers but the ring would be discontinuous between adjacent apertures.

Also of note is that the shape of core plates and finished friction discs are diverse in the wet brake and clutch industry. The embodiment is representative of these various embodiments. Other shapes and configurations could use the invention herein with equally good results. A common alternative configuration would be a wet clutch having selective placement of pucks of frictional material substantially spaced apart from each. Another configuration would embody discs which accommodate an axle having a diameter not much less than the inner edge diameter of the fluid baffle ring.

A further development on the same theme would be to have a ventilated or apertured core plate as shown with the fluid baffle ring affixed thereto but locking the frictional lining material. In this embodiment the frictional lining material would be affixed or otherwise bonded to the adjacent plates in the entire assembly. Thus the surfaces of the brake ring 26 and the outer disc ring 30 which come in contact upon braking with the core plate 18 would be surfaced with the frictional lining material 22. FIG. 1 may be construed to alternatively show that the friction material 22 is bonded to the brake ring 26 and the outer disc ring 30.

Thus it is apparent that there has been provided in accordance with the invention a means to present lubricating and cooling oil to friction material in a fluid environment that fully satisfies the objects, aims and advantages set forth above. While the invention has been described in conjunction with specific embodiments thereof, it is evident that many alternatives, modifications and variations will be apparent to those skilled in the art in light of the foregoing description. For instance, it is conceivable that the shape of the fluid baffle ring could be a multi-sided flat ring rather than a circular ring as shown and discussed in the foregoing specification. Accordingly, it is intended to embrace all such alternatives, modifications and variations as fall within the spirit and broad scope of the appended claims.

What is claimed is:

1. In a friction disc having a core plate with a centrally disposed axle receiving aperture and frictional material bonded thereto for use in a fluid environment the improvement comprising:
    a fluid baffle ring, being a thin flat ring of inelastic material significantly wider than its own thickness, bonded face-to-face to the core plate of the friction disc inboard of the friction material.

2. The invention in accordance with claim 1 wherein the core plate further is equipped with a plurality of radially disposed apertures outboard of the centrally disposed axle receiving aperture wherein the fluid baffle ring is positioned to bridge the radially disposed apertures.

3. The invention in accordance with claim 2 wherein the fluid baffle ring is of a width substantially less than the diameter of the radially disposed apertures whereby bridging of the radially disposed apertures by the fluid baffle ring bridges a central portion of each radially disposed aperture.

4. In a friction disc having a core plate with a centrally disposed axle receiving aperture and a plurality of radially disposed apertures and friction material bonded thereto for inducing fluid flow in a fluid environment the improvement comprising:
    a fluid baffle plate submergible in the fluid environment affixed to each side of the core plate of the friction disc each fluid baffle plate located concentric to the center of the axle receiving aperture;
    a fluid detaining ledge formed between the surface of the core plate and the innermost edge of the fluid baffle ring; and
    an open ended annular chamber formed in each radially disposed aperture by the location of each fluid baffle plate on each side of the core plate partially covering each radially disposed aperture.

5. In the invention of claim 4 the fluid environment being an oil reservoir wherein the fluid baffle plate when emerged in the oil reservoir will be capable of detaining oil of the oil bath at the fluid detaining ledge and further being capable of accumulating oil in the open ended annular chamber.

6. In a friction disc having a core plate with the centrally disposed aperture and a frictional material bonded thereto for use in a fluid environment a means to increase the supply of lubricating and cooling fluid to the frictional material comprising:
    a fluid baffle plate submergible in the fluid environment affixed to each side of the core plate of the friction disc, each fluid baffle plate located concentric to the center of the core plate;
    a fluid detaining ledge formed between the surface of the core plate and the innermost edge of each fluid baffle ring whereby fluid will be detained at the fluid detaining ledge when the fluid baffle ring is submerged in the fluid embodiment and fluid will be released from the fluid detaining ledge when the fluid baffle rings pass out of the fluid environment.

7. The invention in accordance with claim 6 wherein the core plate is equipped with a plurality of radially disposed apertures having diameters larger than the width of the fluid baffle rings through the core plate between each of the fluid baffle rings such that as the radially disposed apertures pass through the fluid environment fluid will be accumulated in the radially disposed apertures and retained therein by the fluid baffle rings until the radially disposed aperture is taken out of the fluid environment whereby the retaining fluid will be allowed to escape from the radially disposed apertures.

8. The invention in accordance with claim 7 wherein the fluid released from the ledge of the fluid baffle ring and the radially disposed apertures flows outwardly from the center of the core plate along the faces of the core plate past the frictional material bonded thereto thus lubricating the frictional material and cooling the frictional material.

9. The invention in accordance with claim 6 wherein the fluid baffle rings are bonded to the core plate.

10. The invention in accordance with claim 7 wherein the friction disc is a wet brake disc for use in a wet brake system.

11. The invention in accordance with claim 7 wherein the friction disc is a wet clutch disc for use in a wet clutch system.

12. In a friction disc for translating motion of a first rotating member to a reactive member in a fluid environment including an oil bath the friction disc comprising:
    a circular core plate having a centrally located splined aperture accommodating the first rotating member in a plurality of radially disposed aperture arranged concentrically around the centrally located splined aperture;
    frictional material bonded to each side of the core plate at the peripheral portion thereof the frictional material having a plurality of grooves formed in the exposed surfaces of the frictional material;
    a fluid baffle ring having an innermost edge formed of thin metal stock bonded to each side of the core plate partially covering the openings of each radially disposed aperture leaving an upper portion and a lower portion of each radially disposed aperture uncovered.

13. The invention in accordance with claim 12 wherein the friction disc may be rotated in conjunction with the first rotating member to be partially submerged in the oil bath whereby oil may flow into the radially disposed apertures and be temporarily restrained therein by the fluid baffle rings as the previously submerged portion of the friction disc is rotated out of the oil bath.

14. The invention in accordance with claim 12 wherein the friction disc may be rotated in conjunction with the first rotating member to be partially submerged in the oil bath whereby oil may be temporarily detained at the innermost edge of the fluid baffle ring as the previously submerged portion of the friction disc is rotated out of the oil bath.

15. In a core plate for use in a brake mechanism, the core plate having a centrally disposed aperture and a plurality of radially disposed apertures for use in a fluid environment the improvement comprising:
    a fluid baffle plate submergible in the fluid environment affixed to each side of the core plate of the friction disc each fluid baffle plate located concentric to the center of the centrally disposed aperture;
    a fluid detaining ledge formed between the surface of the core plate and the innermost edge of the fluid baffle ring; and
    an open ended annular chamber formed in each radially disposed aperture by the location of each fluid baffle plate on each side of the core plate partially covering each radially disposed aperture.

* * * * *